Aug. 2, 1927.

B. F. SEYMOUR 1,637,355

VEHICLE CONSTRUCTION AND SUSPENSION

Original Filed June 22, 1920

Witness
James P. Duhamel

Inventor
Benjamin F. Seymour
By
Attorney

Patented Aug. 2, 1927.

1,637,355

UNITED STATES PATENT OFFICE.

BENJAMIN F. SEYMOUR, OF WASHINGTON, DISTRICT OF COLUMBIA.

VEHICLE CONSTRUCTION AND SUSPENSION.

Application filed June 22, 1920, Serial No. 390,827. Renewed February 2, 1926.

The present invention relates to vehicle construction and resilient suspensions for vehicle bodies and consists in the combinations and arrangements of elements hereinafter described and particularly set forth in the accompanying claims.

The purpose of the invention is to construct a chassisless body vehicle, including the power driven type eliminating the usual frame and transverse axles, also with a resilient means for indirectly absorbing and dissipating all shocks or jars to which the vehicle wheel is subjected, and without causing undue strain on either the wheel or its support or transmitting excessive vibration to the supported load.

Another object of the resilient suspension as proposed herein is the employment of apparatus and disposal of the elements thereof in such manner as will secure the maximum stability of the resilient sustaining structure and most suitable location or distribution of the resilient devices per se with regard to the body on which the same are directly mounted.

The invention further contemplates the employment of a resilient suspension wherein the vehicle wheel is non-revolubly mounted on a stub-axle to the end of avoiding the enormous weight required by using an axle extending entirely across the car, and it is further proposed to employ a drive rotating the said stub-axle, the wheel revolving with said stub-axle.

Figure 1:
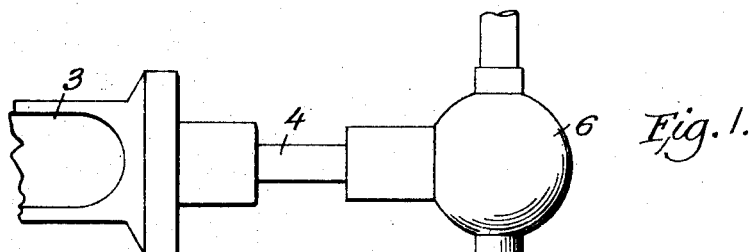
Figure 2:
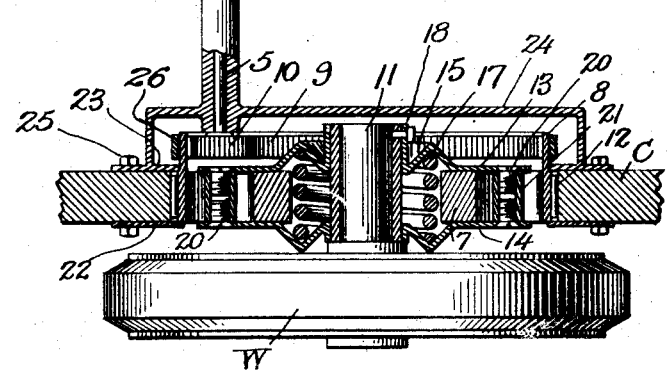
Figure 2:
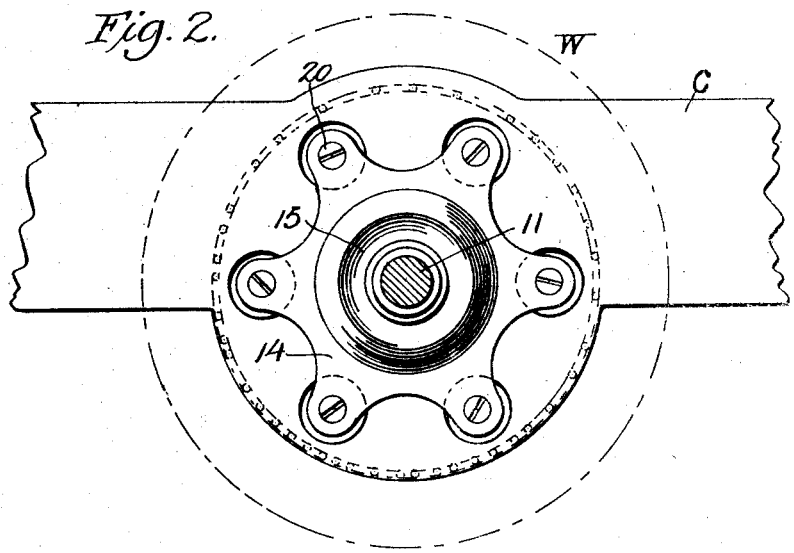

The invention is disclosed by way of illustration in the accompanying drawings, wherein:

Figure 1 is a top plan view thereof with parts in section showing the resilient suspension and transmission, and Figure 2 is a side elevational view thereof.

Referring to the construction in further detail and wherein like reference characters designate corresponding parts in the different views shown, 3 indicates the engine suitably mounted on the car, and 4 the driving shaft thereof that is connected to the driven shaft 5 within the differential casing 6 in the usual way; and the body C is centrally cut away to receive the revoluble head 7 having a flanged portion 8 which carries an internal ring gear 9 whose teeth mesh with the pinion 10 on the driven shaft 5 as shown.

The wheel W is non-revolubly mounted and supported on a stub-axle 11, and secured to said stub-axle is a pair of plates 13 and 14 disposed against opposite sides of the revoluble head 7, and said side plates are constructed with annular recessed portions 15 constituting cam elements; and cooperable with said cam elements is a spring 17 engaging therewith and adapted to operate and provide the resilient suspension for the vehicle body. Any relative transverse movement between the body C and the wheel axle 11 will act to compress the sustaining spring 17 by reason of the opposed conical or annular cam surfaces of the cam elements 15 against which the spring bears. It should also be noted that the spring will be subjected to the cooperating action of the double cones or cam surfaces under any given movement of the vehicle body C or the axle 11 in a direction axially of the wheel.

The two side plates are connected together by the pairs of screws 20 engaging with tubular spacing members 21 that are located within the several openings provided in the revoluble head 7 in the manner shown. The inner plate 13 is secured to the axle 11 by the pin 18, and said side plates and the revoluble head are in turn mounted within the body C by the retaining plates 22 and 23, suitably bolted to the body as at 25, and a plurality of antifriction bearings 12, preferably of the roller type, are located between said revoluble head and the periphery of the opening in the body C.

The inner retaining plate 23 is constructed with an integral casing 24 which provides an inclosure for the inner working parts of the resilient suspension and the transmission, as shown. A brake band 26 encircles the outer surface of the flange 8 which forms, as stated, an integral portion of the revoluble head 7.

It is obvious that those skilled in the art may vary the details of construction and arrangement of parts without departing from the spirit of my invention, and therefore I do not wish to be limited to such features except as may be required by the claims.

Having thus described my invention what I claim as new and desire to secure by Letters Patent is:

1. In a power driven vehicle construction, the combination with a chassisless body of stub axles equipped with wheels, means revolubly mounting each stub axle to said body, a resilient sustaining element cooperating with said means and the stub axle, a driving element associated with said means, and a common power means carried by the body and connected with each of the driving elements, substantially as set forth.

2. In a power driven vehicle construction, the combination with a chassisless body of stub-axles equipped with wheels, a head for each stub-axle revolubly mounted in said body, a resilient sustaining element inserted between and cooperating with said head and the stub-axle, a driving element on said head and power means carried by the body and connected with the driving element, substantially as set forth.

3. In a power driven vehicle construction, the combination with a chassisless body of stub-axles equipped with wheels, a head for each stub-axle revolubly mounted in said body, a resilient sustaining element inserted between and cooperating with said head and the stub axle, cam elements cooperable with the resilient element for laterally compressing the resilient element, a gear on said head, a motor mounted on the body and driving connection between the motor and the gear, substantially as set forth.

4. In a power driven vehicle, the combination of a body, a wheel, a stub-axle therefor, a revoluble head on which said axle is supported, said head being revolubly mounted in said body, a resilient sustaining element located between the revoluble head and the stub-axle, a driving element carried by the revoluble head, a power means, and a drive between the power means and the driving element.

5. In a power driven vehicle the combination of a body having an opening therein, a revoluble head located in said opening, antifriction bearings between said head and the body, a wheel, a stub-axle therefor supported in the revoluble head, a resilient element located between said head and the stub-axle, cam elements cooperable with the resilient element for laterally compressing said resilient element, a flange having a gear element mounted on the revoluble head, a motor, and a drive between the motor and said gear element, substantially as set forth.

6. In a power driven vehicle the combination of a body having an opening therein, a revoluble head located in said opening, antifriction bearings between said head and the body, side plates having cam elements carried by said head, a wheel, a stub-axle therefor supported in said side plates, a resilient element located between said stub-axle and the revoluble head and cooperable with said cam elements, a flange on said head having a gear element, a motor, and a drive between the motor and said flange gear element, substantially as set forth.

In testimony whereof I affix my signature.

BENJAMIN F. SEYMOUR.